United States Patent [19]
Baechtel et al.

[11] Patent Number: 5,063,335
[45] Date of Patent: Nov. 5, 1991

[54] TWO-INPUT CONTROL WITH INDEPENDENT PROPORTIONAL AND INTEGRAL GAINS FOR VELOCITY ERROR AND VELOCITY FEEDFORWARD INCLUDING VELOCITY COMMAND LIMITING

[75] Inventors: Donald F. Baechtel, Lyndhurst; James E. Svarovsky, Sagamore Hills, both of Ohio; Thomas Rehm, Mequon, Wis.

[73] Assignee: Allen-Bradley Company, Inc., Milwaukee, Wis.

[21] Appl. No.: 580,708

[22] Filed: Sep. 11, 1990

[51] Int. Cl.$^5$ .............................................. G05B 11/36
[52] U.S. Cl. .................................. 318/609; 318/610; 318/567; 318/615; 318/616
[58] Field of Search ................... 318/560–646; 364/513, 167, 168, 169; 901/3, 9, 12, 13, 17–23

[56] References Cited

U.S. PATENT DOCUMENTS

| | | | |
|---|---|---|---|
| 4,590,476 | 5/1986 | Burkete | 342/75 |
| 4,680,518 | 7/1987 | Kurakake et al. | 318/561 |
| 4,831,510 | 5/1989 | Dummermuth et al. | 364/167 |
| 4,864,204 | 9/1989 | Daggett et al. | 318/568 |
| 4,864,206 | 9/1989 | Onaga et al. | 318/568.11 |
| 4,864,209 | 9/1989 | Seki et al. | 318/611 |
| 4,868,472 | 9/1989 | Daggett | 318/568.2 |
| 4,868,474 | 9/1989 | Lancraft et al. | 318/568.2 |
| 4,874,997 | 10/1989 | Daggett et al. | 318/568.1 |
| 4,874,999 | 10/1989 | Kuwabara et al. | 318/610 |
| 4,950,967 | 8/1990 | Sakamoto et al. | 318/567 |
| 4,956,593 | 9/1990 | Sakamoto et al. | 318/609 |
| 4,956,594 | 9/1990 | Mizuno et al. | 318/568.1 |
| 4,967,128 | 10/1990 | Sawai et al. | 318/609 |

*Primary Examiner*—Paul Ip
*Attorney, Agent, or Firm*—Quarles & Brady

[57] ABSTRACT

A method for control of servomotors includes limiting velocity feedforward as a second input to a velocity control loop in response to a velocity command, which is a first input, reaching a predetermined limit. Gain parameters for proportional and integral portions of a velocity-torque control loop and for the proportional and integral portions of the velocity feedforward loop may be adjusted independently to obtain varying control responses from the control system. The method is carried out in a microcomputer-based control module for an industrial controller.

4 Claims, 3 Drawing Sheets

_5,063,335_

TWO-INPUT CONTROL WITH INDEPENDENT PROPORTIONAL AND INTEGRAL GAINS FOR VELOCITY ERROR AND VELOCITY FEEDFORWARD INCLUDING VELOCITY COMMAND LIMITING

BACKGROUND OF THE INVENTION

1. Field of the Invention

The field of the invention is motion controllers for controlling servomotor devices on loads such as robots or machine tools.

2. Description of the Background Art

Various types of numerical control, programmable controller and other types of controllers are known for controlling servomotor devices. Servomotors are typically driven with an analog velocity output signal, and a resolver or encoder is attached to provide position feedback signals. Changes in position are determined over time to determine actual velocity, which is then compared with commanded velocity to provide a velocity error input to a velocity control loop. The commanded velocity in turn may be the output of a position control loop in which commanded position is compared with position feedback to provide a position error input.

It is also desirable to limit the velocity output command from the position control loop to some predefined maximum value. This velocity limit should also be applied to any velocity feedforward command $V_{FF}$.

In a prior motor control system, a proportional-integral regulator was used in a velocity control loop, with a gain factor $K_A$ being applied to a velocity feedforward command input to the velocity control loop. The gain factor $K_A$ affected system response to higher frequency components of the velocity feedforward command, but there was no independently controllable gain factor $K_V$ to affect system response to lower frequency components of the velocity feedforward command. In this prior system, there was only one velocity command input to the velocity control loop.

SUMMARY OF THE INVENTION

In its broadest aspects, the invention relates to a method for providing two command inputs to a system for controlling a command output to the servomotor, a velocity command input resulting from a comparison of commanded position and position feedback, and a velocity feedforward command input.

In a more particular aspect, the invention relates to providing independently controllable gain factors for a system with two velocity inputs and a command output.

In another more particular aspect, the invention relates to applying a velocity limit to the velocity commands at the two velocity command inputs.

The two command inputs to the velocity loop are the velocity feedforward command ($V_{FF}$) and a velocity command ($V_{CMD}$). The velocity command ($V_{CMD}$) is an output from a position control loop in which commanded position and position feedback are algebraically summed to provide a position error ($P_{ERR}$). This position error ($P_{ERR}$) is then preferably an input to a position regulator which produces the velocity command output ($V_{CMD}$).

Two feedforward gain factors $K_A$ and $K_V$ are applied to the velocity feedforward command ($V_{FF}$). $K_A$ is a gain factor for controlling the velocity feedforward contribution to the proportional branch of a velocity control loop. $K_V$ is a gain factor for controlling the velocity feedforward contribution to the integral branch of a velocity control loop. The $K_V$ gain factor is applied to the velocity feedforward command ($V_{FF}$) which is then summed with the result of feeding the position error signal to a position regulator to produce a velocity command ($V_{CMD}$). The $K_A$ gain is applied to the velocity feedforward command ($V_{FF}$) and the result is summed with velocity error ($V_{ERR}$) in a velocity-torque control loop.

The velocity limit ($V_{LIMIT}$) is applied to the velocity command. The velocity feedforward command ($V_{FF}$), however, is a separate input to the two-input velocity-torque control loop. Therefore, a hold function (H) is incorporated in the feedforward path or second input to the the velocity-torque control loop and is coupled to the velocity limiting action at the first input, so that both inputs to the velocity control loop are limited. Otherwise, the velocity feedforward command might be unlimited, even though independently controllable gain factors $K_A$ and $K_V$ are provided.

The invention can be practiced in a microcomputer-based servo control module which is interfaced to the servo device through analog output circuitry and encoder/resolver input interface circuitry.

Other objects and advantages, besides those discussed above, shall be apparent to those familiar with the art from the description of the preferred embodiment which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

Figure 1:
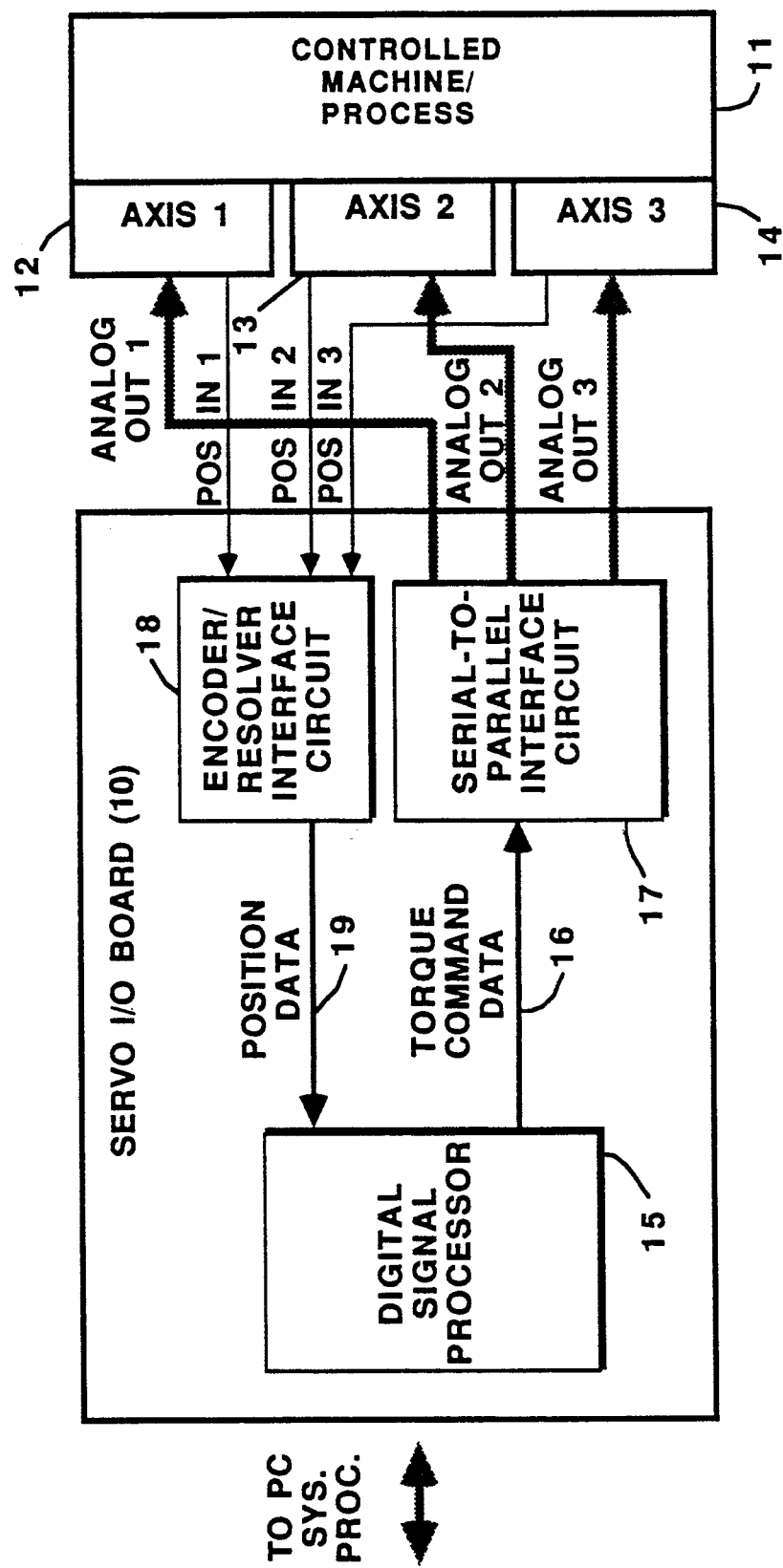
FIG. 1 is a block diagram of the servo control module for carrying out the present invention.

The invention relates to circuitry in a servo I/O circuit board 10 shown in FIG. 1, which is preferably used in an I/O module in a programmable controller that controls a machine or process 11.

Programmable controllers generally have a PC system processor (not shown) which communicates I/O data with the I/O modules connected to the machine or process 11. This includes output data for commanding certain motions and input status data to report the position and status of each axis of motion. Motion is implemented on the servo circuit board under control of a digital signal processor (DSP) 15, which reads the motion commands from the higher-level processors in the controller and generates specific torque and velocity output data to drive the servo motor I/O devices 12, 13, and 14 for AXIS 1, AXIS 2 and AXIS 3 in real time. The digital signal processor (DSP) 15 also reads position feedback data to perform closed loop control of the servo motor I/O devices 12, 13, and 14 for AXIS 1, AXIS 2 and AXIS 3.

The DSP 15 is preferably a TMS-320C25 circuit offered by Texas Instruments, Inc., Dallas, Tex. This microelectronic processor offers high speed processing for servo control loop functions. The processor 15 is connected by a serial data bus 16 to a serial-to-parallel interface circuit 17, which is more particularly described in a copending application of J. Pepera et al. entitled, "Isolation Interface for a Controller I/O Module" and filed on even date herewith. Data are transmitted in a serial stream with frames of sixteen bits for each of the three servo motor I/O devices 12, 13 and 14. The serial-to-parallel interface circuit 17 extracts twelve bits of I/O data for each I/O device 12, 13 and 14, converts the data to an analog output signal, and then transmits the analog output signal through ANALOG OUTPUTS 1-3 to the respective I/O devices 12, 13 and 14.

Each servo I/O device also includes an encoder or resolver for generating encoded signals which correspond to the position of an output shaft on the servo motor. These signals are received by the servo I/O board 10 through the POS IN 1-3 lines seen in FIG. 1. These signals are received by an encoder resolver/interface circuit 18 which includes signal conditioning circuitry, an optical isolation interface circuits and an encoder/resolver signal processing circuit as more particularly described in Dummermuth et al., U.S. Pat. No. 4,831,510, issued May 16, 1989. This circuit transmits position data through a parallel data bus 18 to the DSP 15.

The DSP 15 operates under the direction of a program of instructions to generate the torque output data and to respond to the position feedback data to perform closed loop servo control. The program is preferably stored in a programmable read only memory (PROM) (not shown) and utilizes a random access memory (RAM) (not shown) to store data and temporary results. The portion of the stored program which carries out the invention is an interrupt routine executed within the fine interpolation task. This interrupt routine is explained with reference to the flow chart in FIG. 2 and the control diagram of FIG. 3.

Figure 2:
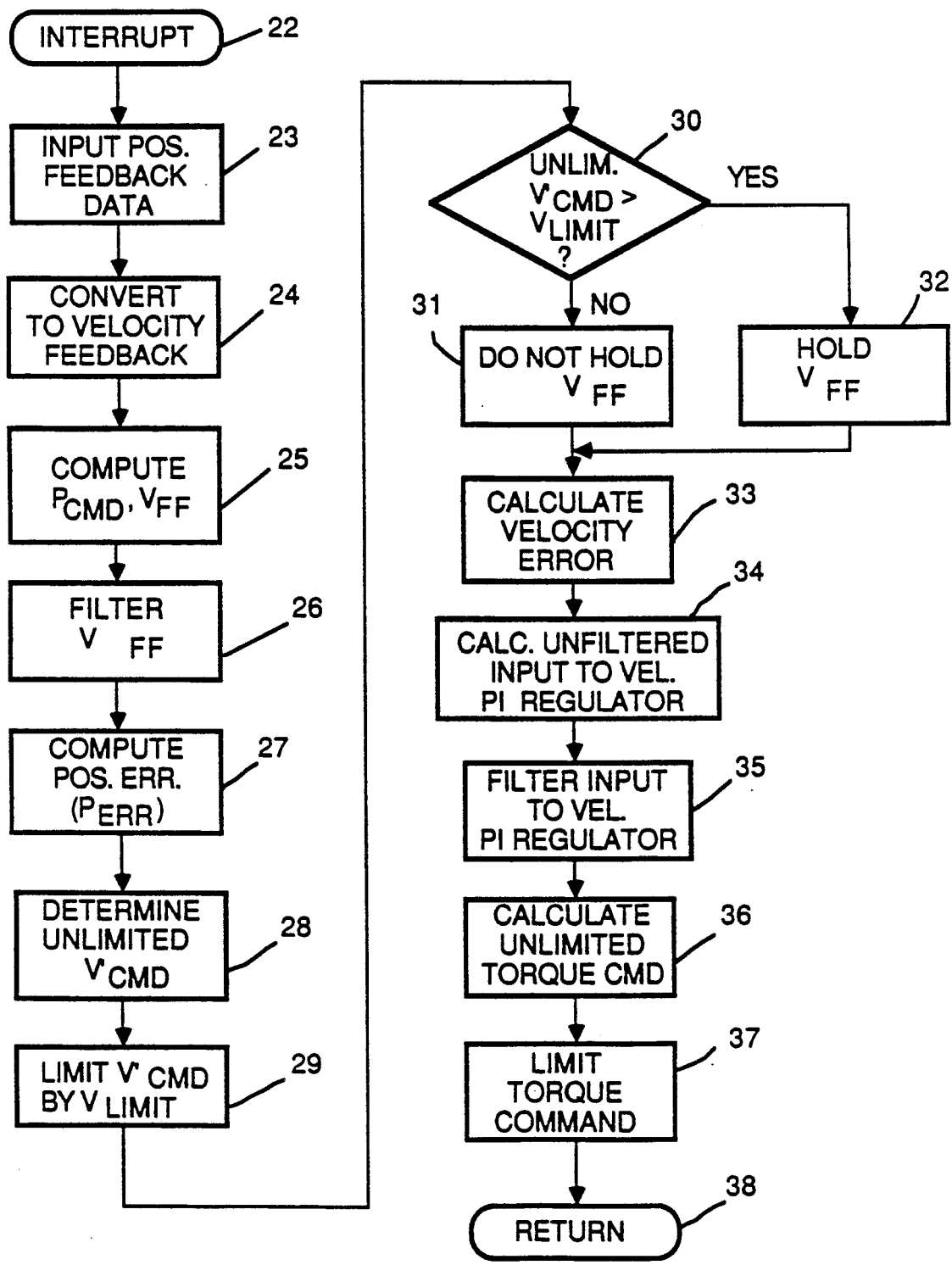
FIG. 2 is a flow chart of a microcomputer program for carrying out the invention.
Figure 3:
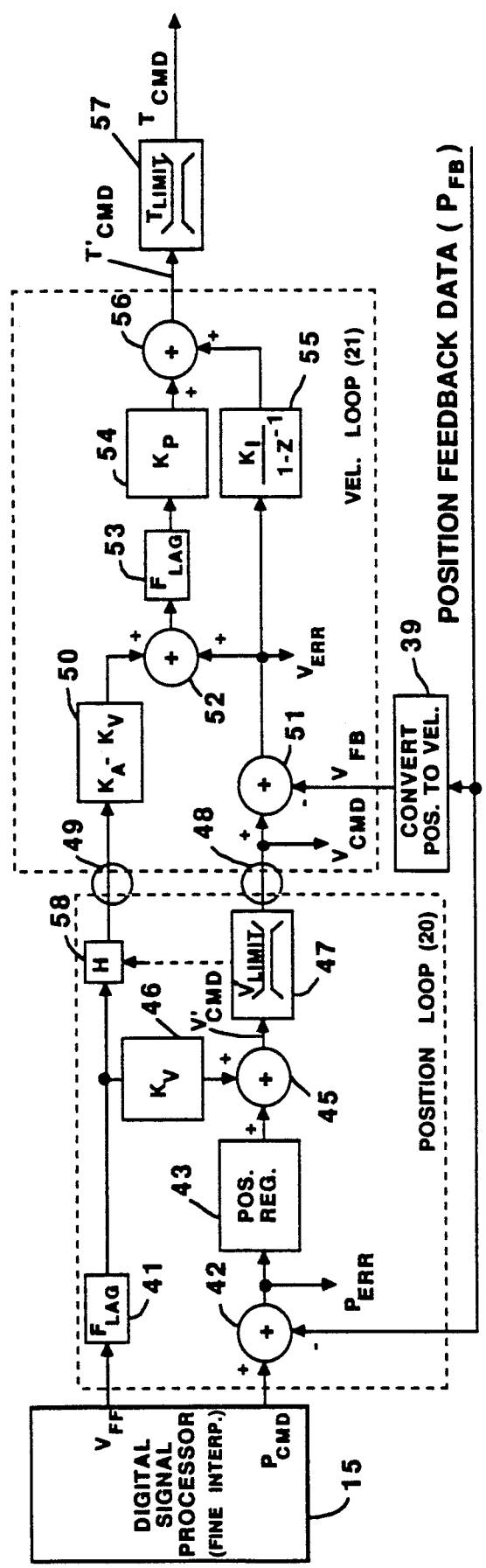
FIG. 3 is a block diagram illustrating the servo control loops executed by the program charted in FIG. 2.

Referring to FIG. 2, the occurrence of the interrupt to begin the interrupt routine is represented by start block 22. As represented by process block 23, the DSP 15 first reads the input position feedback data. As seen in FIG. 3, the position feedback data is returned to the DSP 15 from the encoder/resolver interface 18. The position feedback data is converted to velocity feedback data, as represented by block 39 in FIG. 3, by executing instructions in the interrupt routine as represented by process block 24 in FIG. 2.

As part of this interrupt routine, and as represented by process block 25 in FIG. 2, the DSP 15 computes certain output commands, and these include a Position Command ($P_{CMD}$) and a Velocity Feedforward Command ($V_{FF}$). The Position Command ($P_{CMD}$) and Velocity Feedforward Command ($V_{FF}$) are fed to a Position Loop 20 shown within the dashed box on the left-hand portion of FIG. 3. The Velocity Feedforward Command ($V_{FF}$) is filtered as represented by block 41 in FIG. 3, and by process block 26 in FIG. 2.

As represented by process block 27 in FIG. 2 and summing junction 42 in FIG. 3, the DSP 15 calculates the difference between the Position Command ($P_{CMD}$) and the Position Feedback ($P_{FB}$) to form the Position Error ($P_{ERR}$). This Position Error ($P_{ERR}$) will be used for display purposes and compared against the Maximum Following Error Limit to determine when the control system is within acceptable operating tolerances.

The Position Feedback ($P_{FB}$) data for each axis is algebraically summed with (actually subtracted from) the Position Command ($P_{CMD}$) to generate Position Error ($P_{ERR}$) data. This data may be returned to higher level processors in the controller for display. The data for Position Command ($P_{CMD}$) and Position Feedback ($P_{FB}$) are in the form of unsigned 32-bit absolute position encoder counts. The Position Error will take the form of a 16-bit signed value. If the position error is a number that is too large to be represented by 16 bits, the position error will be set to the largest maximum positive or negative value for 16 bits and a Position Error Limit Exceeded condition will be indicated.

As represented by process block 28 in FIG. 2, the next step in the interrupt routine is to determine a velocity command before comparing it to a velocity limit. The details of this process step are seen in FIG. 3, where a regulation step is applied to the position error ($P_{ERR}$).

The Position Error ($P_{ERR}$) is an input to a position regulator 43 of a type known in the art. The output of this regulator 43 is added at summing junction 45 to the product of the Velocity Feedforward Command ($V_{FF}$) multiplied by Velocity Feedforward Scaling Factor ($K_V$) represented by block 46. This sum is the unlimited velocity command ($V'_{CMD}$).

As represented by process block 29 in FIG. 2, this unlimited velocity command is then limited. As seen in FIG. 3, the unlimited velocity command $V'_{CMD}$ is an input to a Velocity Limit ($V_{LIMIT}$) function, represented by block 47, to form the Velocity Command ($V_{CMD}$) at the first input 48 to the Velocity Loop 21.

The Position Loop 20 is designed in units of encoder counts. The velocity Command ($V_{CMD}$) is a signed 16-bit quantity, has units of percent of maximum feedback velocity and has a range of $+100\%$ to $-100\%$. The Velocity Loop 21 is designed in units of percent of maximum feedback velocity to maximize the resolution of the Velocity Loop 21 for the widest range of application speeds. For example, an application whose maximum feedback velocity is only 5 RPM, should have the same minimum resolution (1 part in $2^{15}$ or 0.00305 percent) as an application that has a maximum feedback velocity of 10,000 RPM. This maximum feedback velocity should be the highest speed commanded or expected to be seen by the feedback device, since it will set the representation of these inputs. If the feedback device encounters a speed greater than this maximum speed, the Velocity Feedback ($V_{FB}$) will be set to $+100\%$ or $-100\%$, and an Overspeed Error will be indicated.

The Velocity Feedforward ($V_{FF}$) value has the same format as the Velocity Command ($V_{CMD}$), and therefore, $K_V$ and $K_A$ are unitless 16-bit unsigned values with a range between 0 and 1.

Looking next at the velocity loop 21 in FIG. 3, there are two inputs from the Position Loop: the Velocity Command ($V_{CMD}$) as shown at input 48 in FIG. 2 and the Velocity Feedforward ($V_{FF}$) as shown at input 49 in FIG. 2. The response of the control system to low frequency components is controlled through input 48 to the velocity loop 21 and by adjusting gain factor ($K_V$), represented by block 46. As gain factor ($K_V$) is increased, the system provides greater response to low frequency components which are transmitted through input 48. The response of the control system to high frequency components is controlled through input 49 and through gain adjustment ($K_A$-$K_V$), represented by block 50. As gain factor ($K_A$) is increased relative to gain factor ($K_V$), the system provides greater response to high frequency components transmitted through input 49.

The percentage of Velocity Feedforward ($V_{FF}$) applied through the Integral Gain ($K_I$), represented by block 55, is controlled by the Velocity Feedforward Gain Factor $K_V$ (block 46). The percentage of the Velocity Feedforward ($V_{FF}$) applied through the Proportional Gain ($K_P$), represented by block 54, is controlled by the Velocity Feedforward Gain Factor $K_A$. Because Velocity Error ($V_{ERR}$) is added to the Velocity Feedforward ($V_{FF}$) at summing junction 52, the factor ($K_A - K_V$), represented by block 50, is applied to the Velocity Feedforward ($V_{FF}$) to cancel the $+K_V$ term included in the Velocity Command ($V_{CMD}$) from the result at summing junction 52, which is then applied to the branch with elements 53 and 54. This arrangement allows the terms $K_A$ and $K_V$ in the transfer functions of the Control Loops 20, 21 to be set independently, providing an additional degree of freedom in determining the response characteristics of the Control Loops 20, 21.

For example, $K_V$ may be set to "0" for a following error system, or for a system with zero steady-state position error, $K_V$ is set to 1.0 or 100% of its maximum. The user may optionally select values between 0 and 1.0.

A set of preferred settings are $K_V = 1.0$ or 100% and $K_A = 0.7$ or 70% of its maximum. The present system, however, allows the user to select other values of $K_A$, such as 1.0 or 0.5 for $K_A$. With $K_V = 1.0$, the setting of $K_A = 0.5$ would provide a softer response to the Velocity Feedforward command than the setting of $K_A = 0.5$.

A further observation is that in the case where $K_A = K_V$, the second input 49 to the Velocity Loop 21 is negated.

Returning to FIG. 2, a check is then made, as represented by decision block 30, to determine if limiting action has, in fact, been effected in executing block 29. If $V'_{CMND}$ has, in fact, been limited in block 29, this is represented by the "YES" result branch. The next step is to hold the velocity feedforward ($V_{FF}$) command to its previous value as represented by process block 32 in FIG. 2 and block 58 in FIG. 3. As seen in FIG. 3, the Hold (H) Function, represented by block 58, is applied to maintain the previous value for the Velocity Feedforward ($V_{FF}$) input 49 to the Velocity Loop, when the velocity limit is encountered.

On the other hand, if $V'_{CMND}$ has not, in fact, been limited in block 29, this is represented by the "NO" result branch, and the HOLD function is not invoked, as represented by process block 31.

Then, as represented by process block 33 in FIG. 2, the DSP 15 executes a block of instructions to calculate the velocity error ($V_{ERR}$). As represented by summing junction 51 in FIG. 3, this involves calculating the difference between the Velocity Command ($V_{CMD}$) and the Velocity Feedback ($V_{FB}$) to form the Velocity Error ($V_{ERR}$). The Position Feedback data ($P_{FB}$) is converted to Velocity Feedback ($V_{FB}$), as represented by block 39, using differentiation, velocity observer or other known techniques. The resulting Velocity Error ($V_{ERR}$) is used for display purposes and is compared against the Maximum Velocity Error Limit to determine when the Velocity Loop 21 is within acceptable operating tolerances.

As represented by process block 34, the DSP 15 next calculates an unfiltered input to a proportional-integral velocity regulator. This is further represented by summation at junction 52 in FIG. 3, where the product of the limited Velocity Feedforward ($V_{FF}$) multiplied by the gain factor ($K_A - K_V$) 50 is summed with the Velocity Error ($V_{ERR}$). This effectively substitutes $K_A*V_{FF}$ for the contribution of $K_V*V_{FF}$ in the Velocity Command ($V_{CMD}$) and Velocity Error ($V_{ERR}$).

The result of the summation at junction 52 is then filtered, as represented by process block 35 in FIG. 2 and by the block 53 labeled (FLAG) in FIG. 3. As represented by process block 36 in FIG. 2, instructions are then executed to calculate a torque command ($T'_{CMD}$) prior to executing further instructions to implement limiting action, as represented by process block 37 in FIG. 2 and block 57 in FIG. 3.

The calculation of the torque command is seen in more detail in FIG. 3. The filtered result from block 53 is multiplied by the Proportional Gain ($K_P$) factor represented by block 54. The Velocity Error ($V_{ERR}$) is also integrated and multiplied by the Integral Gain Factor ($K_I$) represented by block 55, and the result is summed with the result from the proportional branch at represented by summing junction 56. The unlimited torque command ($T'_{LIMIT}$) is then limited by the asymmetric Torque Limits ($T_{LIMIT}$), represented by block 57, to form the Torque Command output ($T_{CMD}$).

The Velocity Loop proportional branch is filtered by a lag filter ($F_{LAG}$), as represented by block 53, to control and high frequency components that may have entered the Velocity Loop 21 up to that point. Because the integral branch of the Velocity Loop 21 is deemed to respond slow enough, no filter is provided in that branch.

The Velocity Feedforward ($V_{FF}$), Velocity Command ($V_{CMD}$), and Velocity Error ($V_{ERR}$) are all signed 16-bit numbers in units of percent of maximum feedback velocity. The Torque Command ($T_{CMD}$) output is a signed 16-bit number with a range between 0 and 100%. The gains $K_P$ and $K_I$ are unsigned 16-bit numbers in units of percent torque per percent velocity error and have a range between 0 and 100. Maximum Torque is the largest Torque Command ($T_{CMD}$) that can be generated by the control and is not the peak torque nor the rated torque of the motor, both of which may be less.

The Torque Limiter ($T_{LIMIT}$) is an asymmetric limiter and has two values for torque limit: one for torque in the positive motor direction, and one for torque in the negative direction. Because there may be substantial differences in losses like friction in the two opposite directions of motor operation, the torque limits may be set differently.

This description has been by way of examples of how the invention can be carried out. Those with knowledge in the art will recognize that various details may be modified in arriving at other detailed embodiments, and that many of these embodiments will come within the scope of the invention. Therefore to apprise the public of the scope of the invention and the embodiments covered by the invention the following claims are made.

We claim:

1. In circuitry for controlling the velocity of a servomotor, in response to a motion command from other circuitry and in response to receiving position information which is fed back from an input device coupled to a servomotor, a servomotor control method comprising:

generating a position command from a processor in response to a motion command received by the processor;

algebraically summing the position command with position feedback derived from the position information to produce a position error result;

generating a velocity command in response to the position error result;

inputting the velocity command as a first input to circuitry operating as a proportional-integral velocity regulator;

generating a velocity feedforward command from the processor in response to the motion command received by the processor;

inputting the velocity feedforward command as a second input to the circuitry operating as the proportional-integral velocity regulator; and generating a command output from the proportional-integral velocity regulator to control the velocity of the servomotor in response to the first and second inputs to the circuitry operating as the proportional-integral regulator.

2. The method of claim 1, wherein the step of generating the velocity command includes multiplying the velocity feedforward command by a first gain factor to provide a first velocity feedforward product; and controlling the velocity command in response to the first velocity feedforward product; and wherein the step of generating the command output comprises multiplying the velocity feedforward command by a second gain factor to provide a second velocity product;

algebraically summing the velocity command with velocity feedback derived from the position information to provide a velocity error result;

algebraically summing the second velocity product with the velocity error result to provide a further result;

inputting the further result to a proportional branch of the circuitry operating as proportional-integral velocity regulator where the further result is multiplied by a third gain factor to produce a proportional output;

inputting the velocity error result to an integral branch of the circuitry operating as proportional-integral velocity regulator to produce an integral output; and algebraically summing the proportional output and integral output to control the command output.

3. The method of claim 2, wherein the first gain factor controls input of the velocity feedforward command to the integral branch of the proportional-integral velocity regulator; and wherein the second gain factor is provided by subtracting the first gain factor from a fourth gain factor that controls input of the velocity feedforward command to the proportional branch of the proportional-integral velocity regulator.

4. The method of claim 1, further comprising the step of limiting the velocity command to a predetermined maximum; and further comprising the step of holding the velocity feedforward command constant at the second input to the proportional-integral velocity regulator, in response to the velocity command reaching the predetermined maximum.

* * * * *